United States Patent Office 3,086,048
Patented Apr. 16, 1963

3,086,048
CHLORO-ALIPHATIC SULFUR PENTAFLUORIDES
Neil Hunter Ray and Hugh Leithead Roberts, Northwich, England, assignors to Imperial Chemical Industries Limited, London, England, a corporation of Great Britain
No Drawing. Filed Aug. 26, 1960, Ser. No. 52,037
Claims priority, application Great Britain Sept. 14, 1959
7 Claims. (Cl. 260—543)

This invention relates to new compounds formed by addition of sulphur chloride pentafluoride to olefines. It is already known that sulphur chloride pentafluoride can take part in various types of reactions; for example, as described in U.S. Patent Nos. 3,063,972 and 3,063,922, it can behave as a free-radical-producing initiator of polymerisations when irradiated by ultra-violet light. We have now found that it can also react with olefines and cyclo-olefines and related unsaturated compounds by simple addition to the unsaturated linkage to produce new compounds of low molecular weight containing the elements carbon, sulphur, fluorine and chlorine.

According to our invention we provide novel compounds of sulphur chloride pentafluoride with olefines and with other non-aromatic compounds containing the ethylenically unsaturated group $>C=C<$ having the general formula $R_1R_2.CCl.C(SF_5)R_3R_4$ wherein $R_1$, $R_2$, $R_3$ and $R_4$ may be hydrogen atoms, alkyl and cycloalkyl groups, and halogen atoms, and $R_1$ and $R_3$ may be joined as for example in a cycloalkyl ring.

More particularly, according to our invention, we provide novel compounds of sulphur chloride pentafluoride with olefins and other non-aromatic compounds which have one of the following general formulae:

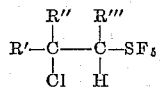

and

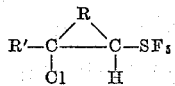

in which R' is a member of the group consisting of hydrogen and chlorine, R" is a member of the group consisting of hydrogen and lower alkyl, R''' is a member of the group consisting of hydrogen and lower alkyl and R is alkylene forming with the carbon atoms shown in the formula a cycloalkyl group.

We also provide a process for manufacturing these compounds which comprises subjecting a mixture of an olefine or another non-aromatic compound containing the ethylenically unsaturated group $>C=C<$ and sulphur chloride pentafluoride to the action of heat or ultra-violet light, under an appropriate pressure, which may be superatmospheric.

The compound obtained from ethylene is 2-chloroethyl sulphur pentafluoride; and from tetrafluoroethylene, the compound 2-chloro-1,1,2,2-tetrafluoroethyl sulphur pentafluoride, and from propylene 2-chloropropyl sulphur pentafluoride. The structure of the latter compound was established by showing that two isomeric pentafluorosulphur-substituted propenes were formed by elimination of hydrogen chloride whereas 2-chloroisopropyl sulphur pentafluoride could give only one compound:

$CH_3.CHCl.CH_2.SF_5 \rightarrow CH_2:CH.CH_2SF_5$
$+CH_3.CH:CHSF_5$
$CH_3.CHSF_5.CH_2Cl \rightarrow CH_3.CSF_5:CH_2$ Butadiene gives 2-chloro 3-butenyl sulphur pentafluoride, and vinyl chloride gives 2.2-dichloroethyl sulphur pentafluoride and cyclohexene gives 2-chlorocyclohexyl sulphur pentafluoride. All the new compounds contain the structure

and are composed of one molecule of sulphur chloride pentafluoride and one of ethylenically unsaturated compound.

One way of carrying out the reaction consists of mixing the ethylenically unsaturated compound and sulphur chloride pentafluoride in proportions ranging as desired from equimolar to three or four mols of unsaturated compound to one mol of sulphur chloride pentafluoride, and heating the mixture for a time ranging from a few minutes to several hours depending upon the reactivity of the olefine. This may conveniently be done in an autoclave wherein the pressure is allowed to rise as the mixture is heated and the reaction is carried out under autogenous pressure, that is the vapour pressure of the reaction mixture at the temperature employed, or alternatively the pressure, may be raised considerably above this level by compressing the reaction mixture, or by compressing the olefine if it is normally gaseous, or by adding an inert gas such as nitrogen under pressure; increasing the pressure in this way speeds up the reaction. The temperature required for the reaction depends on the reactivity of the unsaturated compound; for example, cyclohexene will react at 20° C., while tetrafluoroethylene requires a temperature of 250° C. The pressures employed range from about 5 atmospheres to over 500 atmospheres.

A second method of carrying out the reaction consists of mixing together sulphur chloride pentafluoride and the unsaturated compound, in proportions ranging as desired from equimolar to a two or three molar excess of the latter, in the gaseous phase at about 1 atmosphere pressure, and irradiating the mixture with light from a mercury vapour lamp containing the 2537 A. wavelength line. In this case the reaction is conveniently carried out at ordinary temperatures, but the mixture may be heated to the boiling point of the unsaturated compound, if the latter is normally liquid, in order to obtain a sufficient concentration in the gaseous phase. The reaction usually proceeds very rapidly under these conditions and is often complete in a few minutes. The pressure may either be allow to fall as the reagents are used up, ultimately reaching the vapour pressure of the product which is normally less than 1 atmosphere at the temperature of the reaction, or the pressure may be maintained at approximately the same value throughout by introducing more of the reagents or an inert fluid such as mercury.

From both of these processes the products are conveniently isolated and purified by distillation of the liquids remaining after the crude reaction products have been washed with dilute alkaline solutions and dried or separated.

Some of the novel compounds of the invention have insecticidal properties, particularly those derived from ethylene and propylene. They are also useful as intermediates in preparing other compounds, for example by the action of caustic alkalies hydrogen chloride may be split off to yield unsaturated molecules containing the pentafluoro sulphur group which may be used to introduce this group into other organic compounds.

The invention is illustrated by the following examples but not limited by them.

Example 1

162.5 parts of sulphur chloride pentafluoride and 28 parts of ethylene were introduced into a stainless steel pressure vessel and heated at 90° C. for 10 hours. The initial pressure was 250 atmospheres and this fell to 30 atmospheres by the end of the heating period. On cooling and releasing the pressure 130 parts of liquid products were obtained, which after washing with 5% sodium bicarbonate solution and drying over anhydrous calcium chloride were distilled to yield 95 parts of 2-chloroethyl sulphur pentafluoride, having a boiling point of 92° C., a density $d_4^{20}$ of 1.64 g./ml. and a molecular weight of 190.

Found: C, 12.7; H, 2.3; Cl, 19.1; F, 52; S, 16.1%. Required for $C_2H_4ClF_5S$: C, 12.6; H, 2.1; Cl, 18.6; F, 49.9; S, 16.8%.

*Example 2*

162.5 parts of sulphur chloride pentafluoride were condensed into a stainless steel autoclave and allowed to warm up to room temperature. The pressure was then raised from 10 atmospheres (the vapour pressure of sulphur chloride pentafluoride) to 100 atmospheres by adding 28 parts of ethylene under pressure. The autoclave was heated to 120° C. for 3 hours, then cooled and the pressure released. The autoclave contained 100 parts of a liquid which after washing with sodium bicarbonate solution and drying over anhydrous calcium chloride was distilled to give 82 parts of 2-chloroethyl sulphur pentafluoride.

*Example 3*

165 parts of sulphur chloride pentafluoride and 42 parts of propylene were heated in an autoclave for 1 hour at 100° C. The pressure was 40 atmospheres at first and fell to about 2 atmospheres at the end of the reaction. The product, 184 parts, was washed with sodium bicarbonate solution, dried over anhydrous calcium chloride and distilled, giving 161 parts of 2-chloropropyl sulphur pentafluoride, boiling point 108° C.

Found: C, 17.8; H, 3.2; Cl, 16.6; F, 41.3; S, 15.8%. Mol. wt. 199. Required for $C_3H_6ClF_5S$: C, 17.6; H, 3.0; Cl, 17.4; F, 46.5; S, 15.7%. Mol. wt. 204.5.

*Example 4*

15 parts of propylene and 15 parts of sulphur chloride pentafluoride were mixed in an autoclave and heated under autogenous pressure (16–20 atmospheres) for 3 hours. The contents of the autoclave, after washing with sodium bicarbonate solution and drying, were distilled yielding 22 parts of 2-chloropropyl sulphur pentafluoride as identified in Example 3.

*Example 5*

162.5 parts of sulphur chloride pentafluoride and 42 parts of propylene contained in a burette over mercury, at 1 atmosphere total pressure, were irradiated with light from a mercury vapour discharge tube which was rich in 2537 A. radiation, for 10 minutes. During this time the volume of the system decreased to one-eighth of the initial volume and a liquid condensed on the surface of the mercury which had B.P. 108–109° C., and was identical with the product obtained in Example 3.

*Example 6*

158 parts of sulphur chloride pentafluoride and 20 parts of butadiene were heated at 100° C. for 2 hours. The product, 66 parts, was washed with sodium bicarbonate solution and steam-distilled. The lower layer of the distillate was dried over anhydrous calcium chloride and distilled giving 29 parts of 2-chloro-3-butenyl sulphur pentafluoride, $C_4H_6ClF_5S$, boiling point 78–80°/25 mm.

Found: C, 22.2; H, 3.3; Cl, 20.2; F, 44.0; S, 14.3%. Required for $C_4H_6ClF_5S$: C, 22.0; H, 3.2; Cl, 16.2; F, 43.5; S, 14.6%.

The compound was not considered to be the isomeric 4-chloro-2-butenyl sulphur pentafluoride because its infrared absorption spectrum showed strong bands attributed to a vinyl group.

*Example 7*

160 parts of sulphur chloride pentafluoride and 77 parts of cyclohexene were stirred at 20° C. and 10 atmospheres pressure for 1 hour. The product, 200 parts, was washed with sodium bicarbonate solution and steam-distilled. The lower layer of the distillate was dried with anhydrous calcium chloride and then distilled giving 37 parts of a liquid boiling at 188°–190° C. and having a density $d_4^{20}$ 1.48, and considered to be 2-chlorocyclohexyl sulphur pentafluoride.

*Example 8*

149 parts of sulphur chloride pentafluoride and 38 parts of vinyl chloride were heated at 150° C. for 6 hours in an autoclave. The product, 116 parts, was washed with dilute potassium carbonate solution, dried over anhydrous calcium chloride and distilled, giving 50 parts of 2-2-dichloroethyl sulphur pentafluoride having a boiling point 108° C.

Found: C, 11.0; H, 1.4; Cl, 32.7; F, 40.6; S, 13.9%. Mol. wt. 221. Required for $C_2H_3Cl_2F_5S$: C, 10.7; H, 1.4; Cl, 31.6; F, 42.0; S, 14.2%. Mol. wt. 225.

The compound was not sonsidered to be the isomeric 1-2-dichloroethyl sulphur pentafluoride since this was obtained by chlorination of vinyl sulphur pentafluoride and shown to have different properties.

What we claim is:

1. A compound having a formula selected from the group consisting of

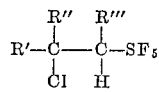

and

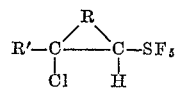

in which

R' is a member of the group consisting of hydrogen and chlorine,

R" is a member of the group consisting of hydrogen and lower alkyl,

R'" is a member of the group consisting of hydrogen and lower alkyl and

R is alkylene forming with the carbon atoms shown in the formula a cycloalkyl group.

2. The compound of sulphur chloride pentafluoride and ethylene defined as 2-chloroethyl sulphur pentafluoride and having the formula $CH_2Cl.CH_2(SF_5)$.

3. The compound of sulphur chloride pentafluoride and propylene defined as 2-chloropropyl sulphur pentafluoride and having the formula $CH_3.CHCl.CH_2(SF_5)$.

4. The compound of sulphur chloride pentafluoride and butadiene defined as 2-chloro-3-butenyl sulphur pentafluoride and having the formula $$CH_2{:}CH.CHCl.CH_2(SF_5)$$

5. The compound of sulphur chloride pentafluoride and vinyl chloride defined as 2-2-dichloroethyl sulphur pentafluoride and having the formula $CHCl_2.CH_2(SF_5)$.

6. The compound of sulphur chloride pentafluoride and cyclohexene defined as 2-chlorocyclohexyl sulphur pentafluoride and having the formula

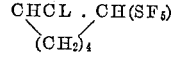

7. A process for making compounds having a formula selected from the group consisting of

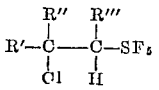

and

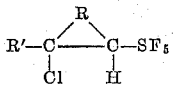

in which
- R' is a member of the group consisting of hydrogen and chlorine,
- R" is a member of the group consisting of hydrogen and lower alkyl,
- R'" is a member of the group consisting of hydrogen and lower alkyl and
- R is alkylene forming with the carbon atoms shown in the formula a cycloalkyl group, said process comprising reacting sulphur chloride pentafluoride with a compound having a formula selected from the group consisting of

and

in which R', R", R'" and R have the meanings indicated above, at a temperature within the range of about 20–250° C.

References Cited in the file of this patent

Hoffman et al.: J.A.C.S., vol. 79, pp. 3424–3429 (1957), 260–543.

Dresdner et al.: J.A.C.S., vol. 81, pp. 574–577 (1959), 260–543.

Roberts et al.: J. Chem. Soc. (London), (1960) pp. 665–667, QD1 C6.

Case et al.: "Chem. Abstracts," vol. 55, pp. 24533–4 (1951).